Aug. 13, 1968  L. SCHWAB  3,396,517

FILTERS

Filed Jan. 29, 1964

INVENTOR.
LOUIS SCHWAB
BY
ATTORNEY

United States Patent Office 3,396,517
Patented Aug. 13, 1968

3,396,517
FILTERS
Louis Schwab, Orlando, Fla. (% CRS Industries, Inc., 101 S. Front St., Philadelphia, Pa. 19106)
Filed Jan. 29, 1964, Ser. No. 340,923
3 Claims. (Cl. 55—368)

ABSTRACT OF THE DISCLOSURE

A filter for liberating solid particles suspended in an air flow in which an inner hollow member of rectangular cross section and truncated-pyramidical shape open at both ends is nested in a hollow outer member also of rectangular cross section and truncated-pyramidical shape but less tapered than the inner member to define an air space between the two members. The outer member is open at its wide end but closed at its narrow end by a flat end wall. The two nested members are secured at their wide ends to a rectangular frame and are substantially coextensive with the opening of the frame. Both members are made of air permeable fabric, the porosity of the outer member being less than that of the inner member. The open area of the narrow end of the inner end being small in comparison with the open area at the wide end of the outer member which, in turn, is small in comparison with the total air permeable area of the side walls and the end wall of the outer member.

---

This invention relates to filters for separating entrained solid particles from gaseous fluids.

It is the principal object of the present invention to provide a filter which has a greatly increased life span without changing the amount of filter media used, or the efficiency, as compared to filters employing similar media.

It is a further object of the present invention to provide a filter comprising a plurality of porous filter media of the same or different densities with an inner and outer disposition of the media, the inner media being separated and having a discharge opening providing an improved action.

It is a further object of the present invention to provide a filter with inner and outer porous filter media in spaced relation in which the major collection of solid material is effected on the inner media.

It is a further object of the present invention to provide a filter for the separation from a gaseous fluid of entrained solid material which employs a plurality of porous filter media and in which the gaseous stream flows through each media independently.

It is a further object of the present invention to provide a filter for the separation of solid particles from a gaseous fluid having inner and outer porous filter media and in which the inner media is provided with an orifice to provide a pressure relief opening for reducing the pressure on the inner medium when it becomes loaded with separated solid particles.

It is a further object of the invention to provide a filter which is inexpensive to construct so that it may be discarded when it has completed its solid particle separation.

Other objects and advantageous features of the invention will be apparent from the description and claims.

The nature and characteristic features of the invention will be more readily understood from the following description, taken in connection with the accompanying drawings forming part thereof, in which.

Figure 1:
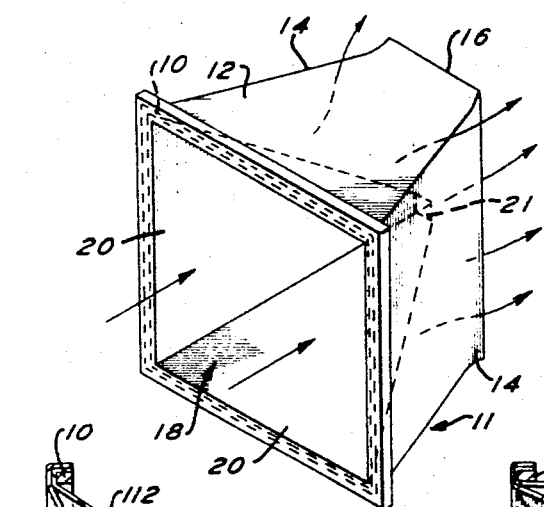
FIGURE 1 is a view in perspective of a preferred form of filter in accordance with the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated, the filter, in accordance with the invention, preferably includes an open mounting and supporting frame 10. The frame 10 may be made of metal, fiberboard or other desired material and has a shape to conform to the location of mounting in a duct (not shown) in which the filter is employed.

As illustrated, the frame 10 has a closed outer receiver or receptacle 11 which is preferably of frusto-pyramidal shape with top and bottom wall portions 12 and 13 which may be of trapezoidal shape and front and rear wall portions 14 which may be of substantially rectangular shape, and a substantially rectangular rear end wall 16. The wall portions 12, 13, and 14, at their meeting locations, are united or made integral to provide a receptacle 11 in the form of a bag with its front margins 17 extending around an in enclosed relation to the supporting frame 10.

The outer receptacle 11 is preferably made of a relatively dense fabric having fine pores and a high efficiency, and with a pressure drop therethrough in the range from approximately 0.08 to 0.14 inch of water at 60 feet per minute air velocity. For this purpose a suitable fabric is of cloth made of fiberglass, felted textile fibers, or non-woven acrylic fibers. The area of the cloth in the receptacle 11 is preferably from about two to ten times the effective inlet area of the frame 10.

Within the outer receptacle 11 an inner receptacle 18 is provided secured at its front margins 19 to the frame 10 and being spaced therefrom for the remainder of its longitudinal disposition. The inner receptacle 18 is tapered for this purpose and is frusto-conical or frusto-pyramidal. As shown trapezoidal shaped panels 20 are connected along their meeting edges, with an orifice 21 provided at its inner or discharge end portions.

The inner receptacle 18 preferably has a greater taper or convergency than the outer receptacle 11 to provide the gas space 22 therebetween at the discharge end and along the sides of the inner receptacle 18. The inner receptacle 18 is preferably of fabric, may be the same cloth as that of the outer receptacle, but is preferably of a fabric of lighter density and lower efficiency, and with a pressure drop thereacross in the range of from approximately 0.02 to 0.06 inch of water at 60 feet per minute air velocity. The filtering area of the fabric of the inner receptacle 18 is preferably in the range from about one to eight times the effective inlet area of the supporting frame 10. The orifice 21 may be varied in size but is preferably of the order of 1% to 5% of the effective inlet area of the supporting frame 10.

In use, gas with entrained solid particles to be removed is delivered into the interior of the inner receptacle 18 through the entrance provided at the supporting frame 10. The major portion of the material to be removed is deposited on the inner surfaces of the inner receptacle 18. The gas space 22 between the inner and outer receptacles 11 and 18 provides a separation so that the gas flows through the walls of each receptacle independently and prevents the two media acting as one, thereby reducing the clogging of the media of the outer receptacle. The orifice 21 serves as a pressure relief opening to reduce the pressure on the fabric of the inner receptacle 18 when it becomes loaded with dirt or other solid particles to be separated.

Figure 4:
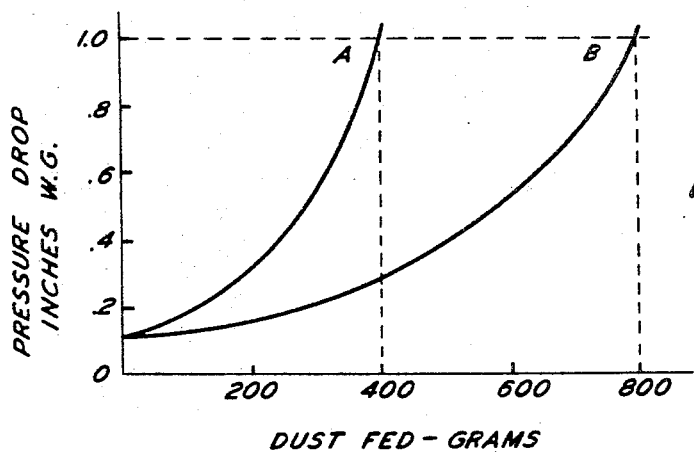
FIG. 4 is a chart showing a comparison of a filter in accordance with the invention and a filter lacking the orifice in the inner filter media.

Referring now to FIG. 4, operating curves are shown on coordinates in which abscissas are plotted in terms of dust fed in grams and ordinates are plotted for pressure drop in inches of water.

Figure 2:
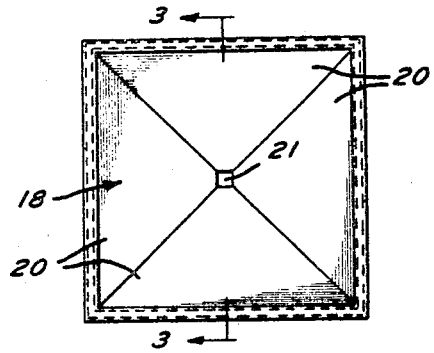
FIG. 2 is an end elevational view of the filter shown in FIG. 1 as seen from the upstream or entrance end.
Figure 3:
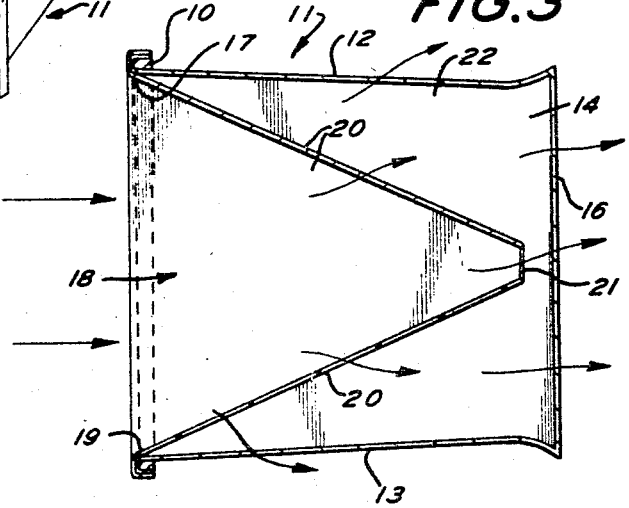
FIG. 3 is a vertical sectional view, enlarged, taken approximately on the line 3—3 of FIG. 2.

Curve A shows typical loading characteristics for a filter like that shown in FIGS. 1, 2 and 3 but without any orifice 21.

Curve B shows typical loading characteristics for a filter as illustrated in FIGS. 1, 2 and 3.

It is common practice, in normal commercial filter operation, to discard a filter when the pressure drop therethrough has reached approximately 0.75 to 1.0 inch of water. The rapid rise of pressure with a filter not having an orifice 21 comes about because as dirt builds up on the surface the pressure increases until it commences to force the collected solid material through the relatively porous cloth. This accumulation, as it unloads rapidly, clogs the more dense outer filter media with a subsequent pressure rise which limits the use of the filter.

The provision of a filter assembly as shown in FIGS. 1, 2 and 3 and with an orifice 21 being provided for pressure relief prevents the collected material unloading, allows a more gradual rise of pressure, and provides greater holding capacity as indicated on curve B of FIG. 4. The useful life of the filter is extended to two or three times the life of a filter not having a pressure relief orifice 21.

Figure 5:
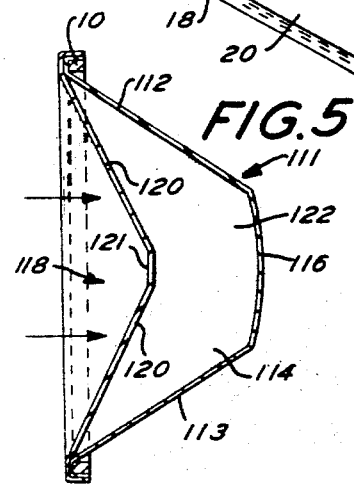
FIG. 5 is a vertical central sectional view of a modified form of filter in accordance with the invention.

Referring now more particularly to FIG. 5, a modified form of the invention is illustrated having a frame 10 with an outer receptacle 111 made of substantially side, top and bottom trapezoidal panels 112, 113, and 114 with a back end wall panel 116. An inner receptacle 118 is provided, as before, but of limited depth, with walls 120 and orifice 121.

The outer receptacle 111 for this type of filter has a depth of approximately one-sixth to one-fourth that shown in FIGS. 1, 2 and 3 and has a space 122 therein. The media of which the outer receptacle 111 is made is preferably more porous, less dense and of lower efficiency than the outer receptacle 11 of FIGS. 1, 2 and 3. Satisfactory results are obtained, however, with space limitations which require a reduction of the overall dimension in the direction of air flow.

It will thus be seen that a filter has been provided with which the objects of the invention are attained.

I claim:

1. A filter for liberating solid particles suspended in an air flow, said filter comprising in combination:
   a substantially rectangular frame;
   a hollow outer member having a generally truncated-pyramidical shape of substantially rectangular cross section, said outer member being open at its wide end and closed at its narrow end by an end wall, the open area of the open wide end of the outer member being substantially coextensive with the opening of the frame and about one-half to one-tenth of the total surface area of the side walls and the closed end wall of the member, said member being secured at its open wide end to said frame, the open end of the outer member constituting the upstream side and the closed end the downstream side thereof,
   an inner hollow member open at both ends and having a substantially truncated-pyramidical shape and a substantially rectangular cross section, the taper of the inner member being greater than that of the outer member and the length of the inner member less than that of the outer member, the open area of the inner member at the wide end thereof being substantially coextensive with the open area of the outer member and the open area at the narrow end about 1% to 5% of the open area on the upstream side of the outer member,
   the inner member being nested in the outer member and secured at its wide end to said frame substantially coextensive with the open wide end of the outer member,
   said outer member and said inner member being made of an air permeable fabric, the fabric of the outer member being less porous than that of the inner member.

2. The filter according to claim 1 wherein the fabric of the outer member has a pressure drop thereacross of about 0.08 to 0.14 inch of water pressure at 50 feet per minute of air velocity, and the fabric of the inner member has a pressure drop thereacross of about 0.02 to 0.06 inch of water pressure at 60 feet per minute of air velocity.

3. The filter according to claim 1 wherein the depth of the outer member between the upstream and the downstream side thereof is less than the width and height of the frame opening.

References Cited

UNITED STATES PATENTS

| 249,931 | 11/1881 | Harned | 43—118 |
|---|---|---|---|
| 1,103,656 | 7/1914 | Campbell | 43—118 X |
| 1,312,096 | 8/1919 | Boyle | 43—118 |
| 1,474,087 | 11/1923 | Prime | 43—100 |
| 1,561,661 | 11/1925 | Pepper | 43—118 |
| 1,709,884 | 4/1929 | Slocum | 55—309 |
| 1,823,365 | 9/1931 | Kozlowski | 43—118 |
| 2,011,200 | 8/1935 | Ritchie | 55—511 X |
| 2,726,478 | 12/1955 | Pullen | 43—100 |
| 1,053,573 | 2/1913 | Clemm | 210—315 |
| 1,202,723 | 10/1916 | Jackson | 210—434 |
| 1,422,105 | 7/1922 | Kirby | 55—367 |
| 1,448,322 | 3/1923 | Wirls | 55—364 X |
| 2,068,858 | 1/1937 | Jones | 55—482 |
| 2,390,196 | 12/1945 | Taylor | 55—368 |
| 2,514,809 | 7/1950 | Soergel | 55—334 X |
| 2,729,303 | 1/1956 | McMahan | 55—367 X |
| 2,853,154 | 9/1958 | Rivers | 55—341 |
| 2,935,158 | 5/1960 | Braun | 55—368 X |
| 2,964,127 | 12/1960 | Korn | 55—487 X |
| 3,084,609 | 4/1963 | Onstad. | |

FOREIGN PATENTS

| 596,334 | 4/1960 | Canada. |
|---|---|---|
| 679,691 | 1/1930 | France. |
| 1,115,158 | 12/1955 | France. |
| 887,162 | 10/1943 | France. |

HARRY B. THORNTON, *Primary Examiner.*

D. TALBERT, *Assistant Examiner.*